Oct. 6, 1970 TERUO KAWATA 3,532,283

APPARATUS FOR TRANSPORTING ENDLESS TAPE AT HIGH SPEED

Filed Nov. 25, 1968 2 Sheets-Sheet 1

INVENTOR.
TERUO KAWATA
BY Glascock, Downing & Seebold
ATTORNEYS

INVENTOR.
TERUO KAWATA
BY Glascock, Downing & Seebold
ATTORNEYS

United States Patent Office 3,532,283
Patented Oct. 6, 1970

3,532,283
APPARATUS FOR TRANSPORTING ENDLESS TAPE AT HIGH SPEED

Teruo Kawata, 59 Imaikecho, Nishinariku, Osaka, Japan

Filed Nov. 25, 1968, Ser. No. 778,681
Claims priority, application Japan, Nov. 25, 1967, 42/75,591
Int. Cl. B65h *17/48*
U.S. Cl. 242—55.19 7 Claims

ABSTRACT OF THE DISCLOSURE

An endless tape winding apparatus provides the tape in two interconnected coils, each coil being carried on a separately rotatable reel, the take-up reel having an axis inclined forwardly and feed reel having an axis inclined rearwardly so that tape can pass upwardly from the inter convolution of the take-up coil to the higher outer convolution of the feed coil. Tape then passes from the inner convolution of the feed coil via guide and drive means, past a recording and reproducting station to finally return to the outer periphery of the take-up coil. The feed reel hub is larger and heavier than the hollow hub of the take-up reel to provide the smoothing effect of a flywheel in the tape movement even though three-fourths of the tape is carried by the take-up reel.

The present invention relates to a reel apparatus in a video tape recorder for a high-speed endless tape and more particularly to an apparatus for transporting a high-speed endless tape whereby the endless magnetic tape is advanced at a high speed in one direction with respect to a stationary magnetic recording head and video signals are record thereon during this travel.

Since video signals involve a wide range of frequency almost 200 times as wide as that of audio signals, there is a necessity to drive the tape at a high speed as, for example, at 5.5 m./sec. and the tape must be more than 300 m. in the entire length.

However, in case such a long endless tape is driven at a high speed by a drive roller and delivered from or wound on a conventional reel for endless tape, there arises various objections because the diameter of the roll at the point where the tape leaves the reel is different from the diameter of the roll at the point where the tape is taken up and this inevitably results in difference in speed at the respective points of the tape.

Enumerated as the above-mentioned objections are firstly tearing of the tape due to the tension exerted on the take-up side of the tape, and secondly irregularity in the running rate of the tape. Even when the tape is strong and ensured against tearing and the drive roller is driven with precision, there is produced a wave in spiral lapping portions of the tape and the irregular friction thereby created between adjacent portions of the tape further gives rise to the irregular variations mentioned above in the running speed of the tape.

These variations which become pronounced in proportion to the rotating rate of the endless reel and the amount of the wound-up roll of tape consequently cause the endless tape to run at an irregular speed with respect to the recording head of video tape recorder and make it extremely difficult to record and reproduce video signals satisfactorily.

An object of the present invention is to overcome the difficulties above described and to provide an endless tape reel apparatus of two-reel type which is simple in structure and suitable for a compact video tape recorder for household use.

Another object of the present invention is to provide an endless tape reel apparatus having an endless tape for video tape recorder housed in a cartridge.

Other objects of the present invention will become apparent from the following description with reference to the accompanying drawings, in which.

Figure 1:
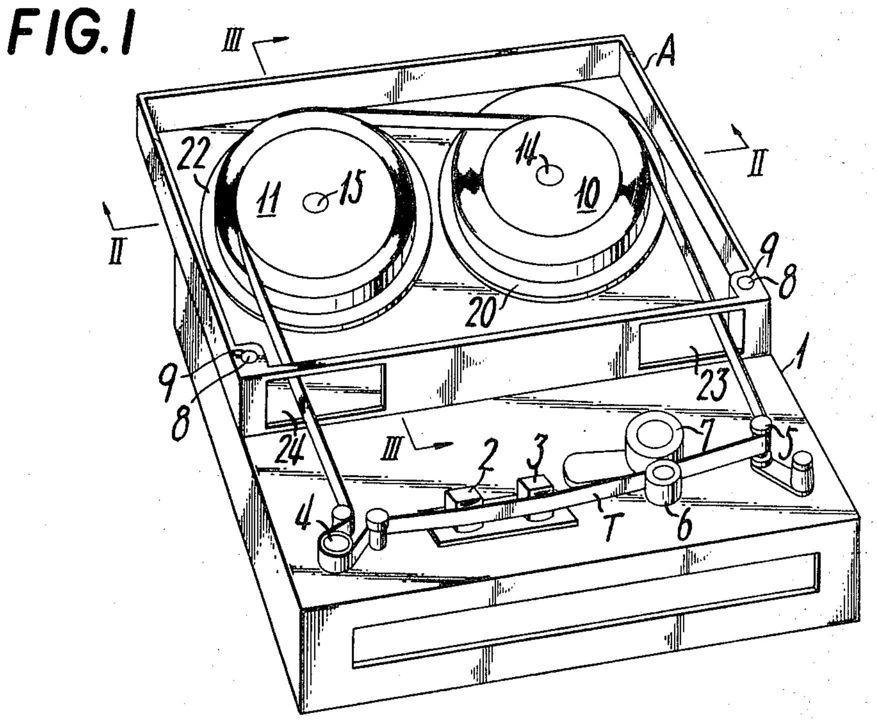
FIG. 1 is a perspective view showing an embodiment of the present invention.
Figure 2:
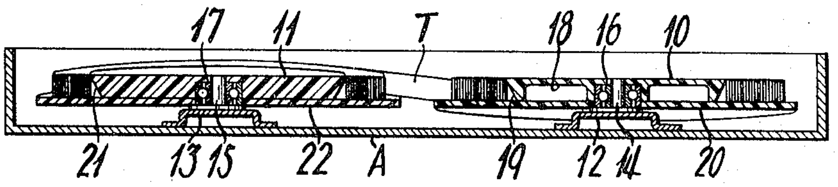
FIG. 2 is a front view in vertical section taken along the line II—II in FIG. 1.

Referring to FIG. 1 numeral 1 designates a main body of a video tape recorder; 2, a recording head; 3, a reproducing head; 4 and 5, tape guides; 6, a tape driving roller adapted to be driven by a motor (not shown) housed within the main body 1; and 7, a pinch roller (A) indicates a case detachably mounted on the video tape recorder main body 1. To mount the case (A) in position, holes 9 are fitted with studs 8 and 8 provided on the top plate of the main body 1. The endless tape reel apparatus of the present invention is housed within the case (A), with a take-up reel 10 on take-up side positioned in the right portion of the case (A) and a feed reel 11 on delivery side positioned in the left portion thereof. As shown in FIG. 2, the reels are respectively and rotatably supported by means of bearings 16 and 17 on the shaft 14 and 15 mounted on bases 12 and 13 which are inclined on the bottom plate of the case (A) in different directions. To reduce the weight, the take-up reel 10 is formed with a hollow portion 18 between the boss and outer periphery. The outer circumferential surface 19 is formed as a bevelled side surface of inverted cone and a reel disc 20 is fixed to the under surface. The base 12 of the take-up reel is upwardly inclined toward the main body of the video tape recorder and therefore the side of the base opposite to the magnetic head is accordingly disposed lower.

The feed reel 11 on delivery side is constructed solidly as illustrated in FIG. 2 to render the weight thereof relatively large and the outer circumferential surface 21 is formed in bevel as in an inverted cone, with a reel disc 22 fixed to the under surface. The base 13 is so inclined that the portion thereof proximate to the main body may be lower and the portion opposite to the magnetic head may be disposed higher, this position being just contrary to that of the base 12. An endless tape (T) passing along a tape guide 5 is passed through an opening 23 in the front of the case (A) and wound from outside on the take-up reel (10) by approximately ¾ the entire length of the tape or by a length slightly longer. The tape is then delivered from the inner side of the reel and wound from the outer side on the feed reel 11 by approximately ¼ the entire length of the tape or by a length slightly shorter. It is then taken out from the inner side of the feed reel 11, passed through an opening 24 of the case (A) and sent along a tape guide 4 to be engaged with the heads 2 and 3. The lengths of the tape respectively wound on both of the endless reels are so adjusted that the diameter of the roll on the take-up reel 10 may be the same as that of the roll on the feed reel 11 when the tape has been wound on the respective reels in the above-described manner.

The present invention has structure of the foregoing description, the take-up reel 10 and feed reel 11 being adapted to be rotated by the endless tape (T) which is advanced by the drive roller 6. When the tape is wound on the take-up reel 10, the endless tape exerts pressure externally on the inner side and thereby produces friction between the contacting portions of the tape, further giving rise to irregular rotation of the take-up reel 10, with the result that as the rotating rate is stepped up the irregularity of the rotation becomes all the more pronounced. This inevitably results in variations in delivery rate of the endless tape wound on the take-up reel. However, the variations in the delivery rate of the endless tape are absorbed and remedied by the winding operation of the feed reel 11. Since the feed reel 11 is larger in size and greater in weight than the take-up reel 10, the flywheel effect of the reel 11 due to the inertia is greater than that of the take-up reel. In addition, because no tension rolers are provided between the take-up reel 10 and feed reel 11, there is produced a phenomenon that the tape (T) is loosely wound around the tape roll which has already been wound on the feed reel 11 due to the inertia acting on the tape (T). Accordingly, the friction created between the convolutions of the tape on the feed reel 11 is extremely small and the feed reel 11 can therefore be allowed to rotate to perform trouble-free delivery of the tape. Moreover, greater inertia acting on the feed reel 11 due to the weight of its own enables it to rotate always at a uniform speed, thus eliminating the irregular delivery of the tape attributable to the irregular rotation of the take-up reel 10 to ensure regular operation of feeding the endless tape on to the heads. The precision video signals can therefore be recorded and reproduced.

In accordance with the present invention, since the planes of the bases 12 and 13 for mounting the two reels are inclined in the directions opposite to each other and the tape delivery portion of the take-up reel 10 is disposed at a low level while the tape-taking up portion of the feed reel 11 is positioned at a high level, the endless tape wound on the take-up reel 10 is ensured against torsion and can be taken out smoothly in exactly the same condition as it was wound up. Furthermore, the circumferential surface of the reels 10 and 11, being formed in bevel, produces an effect that the tape can be unwound satisfactorily.

Figure 4:
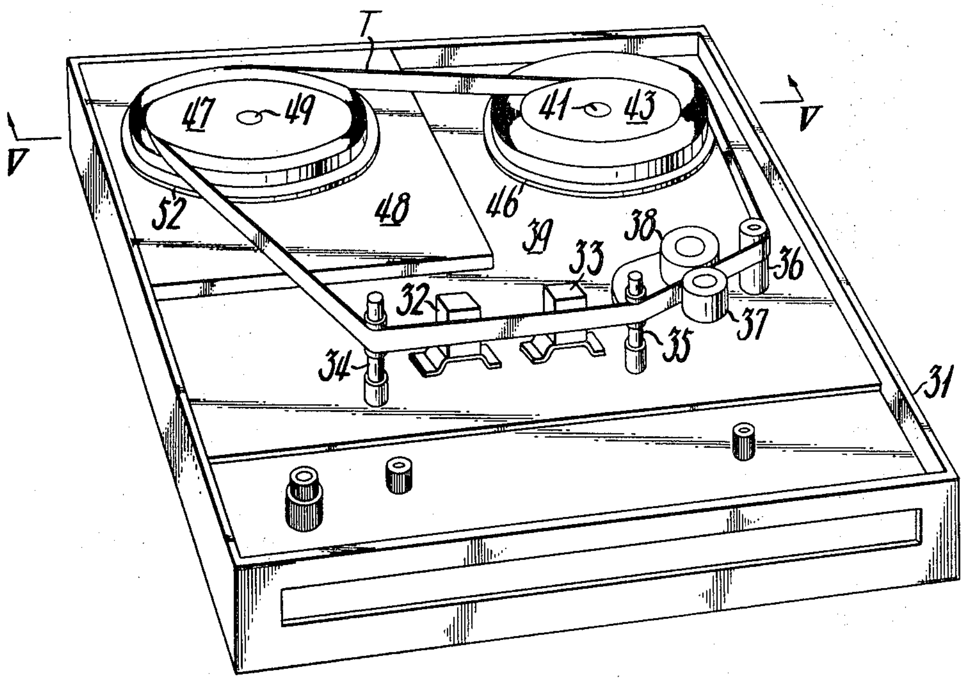
FIG. 4 is a perspective view showing a modified embodiment.
Figure 5:
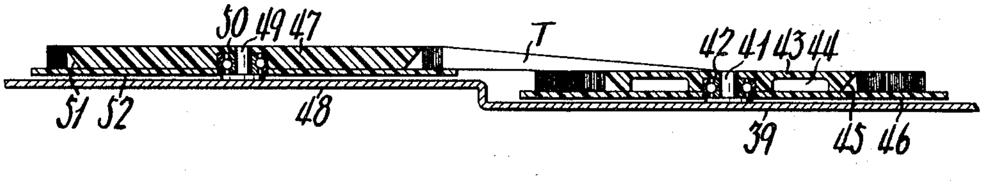
FIG. 5 is a front view in vertical section taken along the line V—V in FIG. 4.

FIGS. 4 and 5 illustrate a modified embodiment of the present invention in which are shown a main body of a video tape recorder 31, a recording head 32, a reproducing head 33, tape guides 34, 35 and 36, a drive roller 37 and a pinch roller 38. In order to reduce the weight, a hollow portion 44 is formed in the take-up reel 43 supported by means of a bearing 42 on a shaft 41 mounted on the base plate 39 of the recorder. The outer circumferential surface of the reel is formed in a slanting surface 45 and a reel disc 46 is attached to the under surface. The delivery reel 47 is supported by means of a bearing 50 on a shaft 49 on the base plate 48 which is disposed at a higher level than the take-up reel 43 approximately by the width of the tape. The diameter of the delivery reel 47 is slightly larger than that of the take-up reel 43 and formed solidly. The outer circumferential surface of the reel 47 is formed in a slanting surface 51 and a reel disc 52 is fixed to the bottom.

By driving the drive roller 37, the endless tape (T) is sent forward, and after having been wound around the take-up reel 43, the tape is further loosely wound on the delivery reel 47 to be delivered from the reel core thereof. This operation is the same as in the embodiment in FIGS. 1 to 2.

It will be seen in the invention that when the travel of the tape is halted by releasing the pinch roller, the tape positioned between the take-up reel and delivery reel is stopped while it is kept taut and without getting loosened, overwinding on itself by inertia or tangling, because the inertia of the delivery reel is greater than that of the take-up reel.

Figure 3:
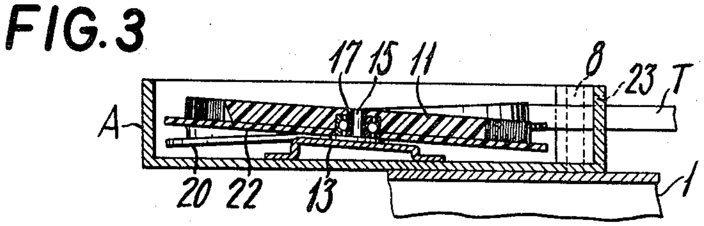
FIG. 3 is a side elevation in section taken along the line III—III in FIG. 1.

The case (A) is the embodiment in FIGS. 1 to 3 may suitably be employed as a cartridge for the tape of video tape recorder. The case in the embodiment in FIG. 4 in which the base plates 39 and 48 respectively receiving the reels are formed as a stepped structure may also be so constructed as to be detachably mounted on the main body of the video tape recorder.

What is claimed is:

1. An apparatus for transporting an endless tape for video tape recorder at a high speed comprising a take-up reel and a feed reel rotatably supported on respective shafts, the diameter of said take-up reel being smaller than that of said feed reel, the under surface of each of said reels being provided with a reel disc, said take-up reel being inclined downwardly toward the front and said feed reel being inclined downwardly toward the rear so that the position where said feed reel receives the tape from said take-up reel is disposed at a level higher than the position where the tape leaves said take-up reel at least by a distance corresponding to the width of the tape.

2. The apparatus for transporting an endless tape for video tape recorder at a high speed as claimed in claim 1 wherein a hollow portion is formed between the boss and outer circumferential portion of said take-up reel to reduce the weight thereof and said feed reel is solidly formed to make the same heavier than said take-up reel.

3. The apparatus for transporting an endless tape for video tape recorder at a high speed as claimed in claim 1 wherein the outer circumferential surfaces of said take-up reel and feed reel are formed as bevelled side surfaces of inverted cones.

4. The apparatus for transporting an endless tape for video tape recorder at a high speed as claimed in claim 1 wherein said feed reel is independently supported on a shaft at a level higher than said take-up reel by a distance corresponding to the width of the tape.

5. The apparatus for transporting an endless tape for video tape recorder at a high speed as claimed in claim 1 wherein said take-up reel and said feed reel are provided with openings for receiving and delivering the tape and individually supported on respective shafts within a case having members to be engaged with the main body of the video tape recorder.

6. The apparatus for transporting an endless tape for video tape recorder at a high speed as claimed in claim 1 wherein the endless tape delivered from said feed reel is advanced along a tape guide roller, brought into contact with a magnetic recording head and a reproducing head, driven by a drive roller, sent along a tape guide roller and wound up on said take-up roller.

7. The apparatus for transporting an endless tape for video tape recorder at a high speed as claimed in claim 1 wherein the length of the tape wound on said take-up reel is about ¾ the whole length and the length of the tape wound on said feed reel is about ¼ the whole length.

References Cited

UNITED STATES PATENTS 2,315,954 4/1943 Gruenhut ______ 242—55.19 XR
2,778,880 1/1957 Eash ________ 242—55.19 XR

FOREIGN PATENTS 1,134,814 11/1968 Great Britain.

BILLY S. TAYLOR, Primary Examiner

U.S. Cl. X.R.

242—199